United States Patent [19]

Wohlfarth et al.

[11] Patent Number: 4,525,782
[45] Date of Patent: Jun. 25, 1985

[54] PROCESS FOR DETERMINING MAINTENANCE AND SERVING INTERVALS ON MOTOR VEHICLES

[75] Inventors: Dieter Wohlfarth, Esslingen; Walter Kostelezky, Ostfildern, both of Fed. Rep. of Germany

[73] Assignee: Daimler-Benz Aktiengesellschaft, Stuttgart, Fed. Rep. of Germany

[21] Appl. No.: 359,922

[22] Filed: Mar. 19, 1982

[30] Foreign Application Priority Data

Mar. 19, 1981 [DE] Fed. Rep. of Germany ....... 3110774

[51] Int. Cl.³ .................... G06F 3/14; G06F 15/20; G07C 5/08; B60S 5/00
[52] U.S. Cl. ................ 364/431.01; 340/52 R; 340/52 D; 364/551
[58] Field of Search ............. 364/424, 551; 340/52 R, 340/52 A, 52 F

[56] References Cited

U.S. PATENT DOCUMENTS

| 4,135,246 | 1/1979 | McMannis | 364/551 |
| 4,159,531 | 6/1979 | McGrath | 364/424 X |
| 4,267,569 | 5/1981 | Baumann et al. | 364/424 X |
| 4,307,374 | 12/1981 | Bode et al. | 340/52 F |
| 4,344,136 | 8/1982 | Panik | 340/52 F X |
| 4,348,653 | 9/1982 | Tsuzuki et al. | 340/52 F |

FOREIGN PATENT DOCUMENTS

| 55-140626 | 11/1980 | Japan | 340/52 F |
| 56-21937 | 2/1981 | Japan | 364/424 |

*Primary Examiner*—Felix D. Gruber
*Attorney, Agent, or Firm*—Craig & Burns

[57] ABSTRACT

A process and apparatus for determining maintenance and servicing intervals on motor vehicles which makes it possible to carry out maintenance or servicing work as a function of the states of wear of the operating parameters to be maintained, wherein values corresponding to the particular states of wear of the operating parameters are fed to a computing unit, and by comparison with values filed in its store the computing unit displays a recommendation to carry out the maintenance work when an operating parameter has approached or reached the wear limit. The motor vehicle driver can thus see which driving behavior to adopt in order to achieve as long a maintenance interval as possible, so that he has an incentive to drive economically. Practice of the invention assures that parts are exchanged or renewed only when this is actually necessary.

33 Claims, 11 Drawing Figures

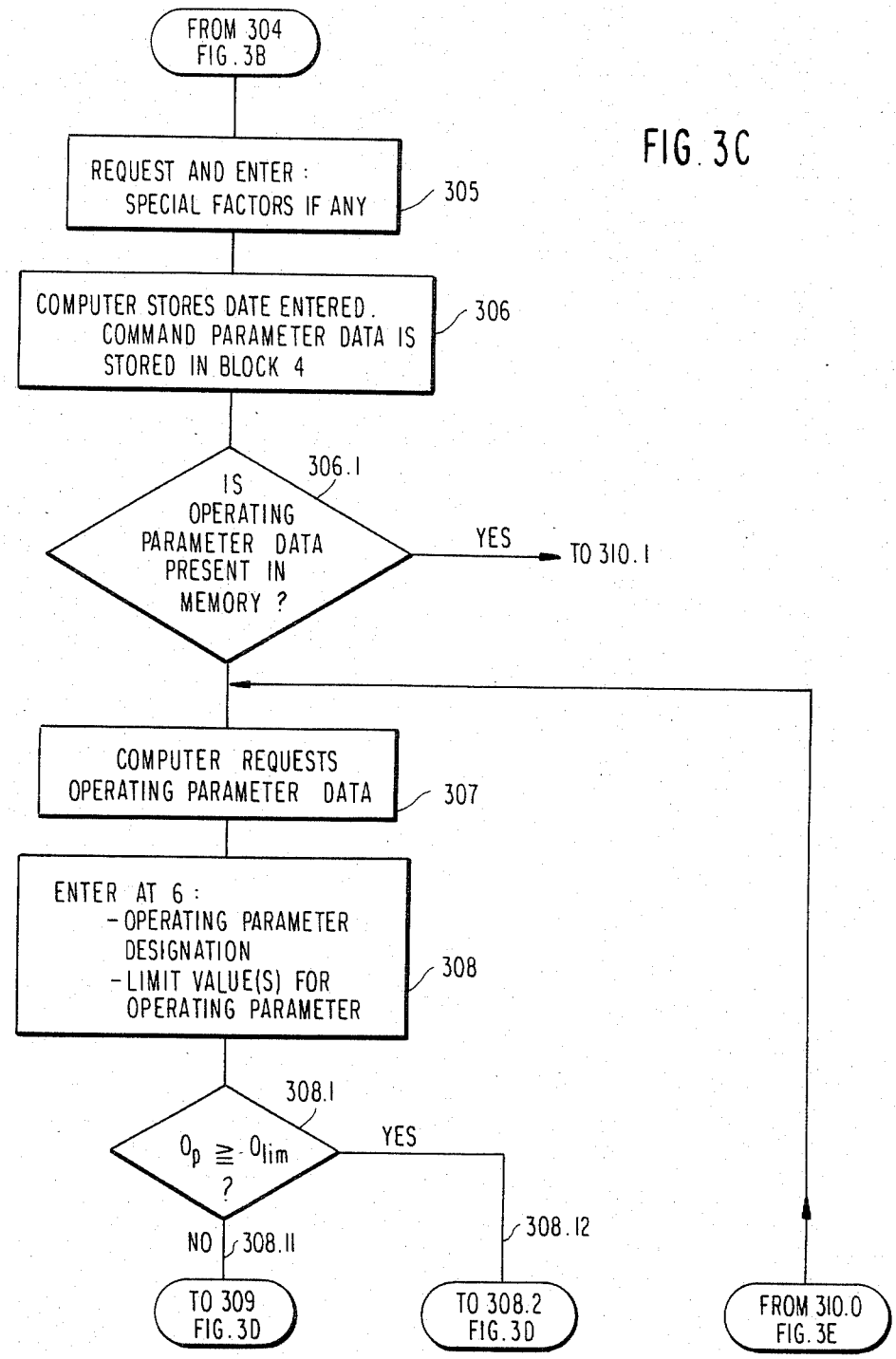

PROCESS FOR DETERMINING MAINTENANCE AND SERVING INTERVALS ON MOTOR VEHICLES

The invention relates to a process for determining maintenance and servicing intervals on motor vehicles, in which a recommendation to carry out the maintenance or servicing work is given to the driver of a motor vehicle when a value, determined during the running of the motor vehicle, of a command parameter fixed as a criterion for the maintenance interval assumes a preset value defining the time of maintenance or servicing.

Such processes for determining maintenance or servicing intervals are known. Especially to fix maintenance times, it is known to stipulate a specific mileage, for example 10,000 km, on which a first maintenance time is based. Maintenance should be carried out when this mileage is reached. Within the meaning of the present invention, the command parameter would, in this case, be the mileage count of the motor vehicle, and, in the example mentioned, a maintenance service would be carried out every 10,000 km. The command parameter is that operating parameter according to which the maintenance times are fixed.

In another process, it is known to detect the number of running hours of the motor vehicle and to carry out the maintenance service when a specific number of running hours, which are a criterion for the maintenance time, has been reached.

A disadvantage of both these processes is that, irrespective of the type of driving of the vehicle driver and, consequently, irrespective of the state of loading of the motor vehicle, a maintenance service which is determined independently of the state of parts dependent on wear is carried out, on an arbitrary basis, after a specific mileage or number of operating hours has been reached. As a result, it can happen, for example, that, on an arbitrary basis, an oil change is carried out after 10,000 km, although the lubricating capacity of the oil could still guarantee safe running without damage to the engine for a further number of kilometers. Conversely, it can happen that, for example in the case of very severe stress on the motor vehicle, the brake linings wear so quickly that the value of the mileage count or number of operating hours, which is a criterion for the maintenance service, is not reached until the operating efficiency of the brakes is already considerably impaired, with the result that the reliability of the vehicle is put in doubt. Consequently, the known processes cannot represent the actual states of wear of operating parameters of the motor vehicle which are dependent on wear.

A feature of the invention resides in the fact that a continuously determined value which is characteristic of the condition of the command parameter is fed to a computing unit with a store in which the characteristic value of the command parameter defining the maintenance time is stored, and that, when the determined value corresponds to the stored value of the command parameter, the computing unit indicates via a display that maintenance work must be carried out, and that further values characteristic of the condition of operating parameters to be maintained as a function of wear are fed to the computing unit and are compared with values likewise stored in the memory of the computer and corresponding to the wear limits of the operating parameters, and then, depending on the state of wear of the operating parameters, the computer assigns these to a maintenance time defined by the command parameter. According to this new process, the maintenance times are determined as a function of a command parameter, for which the state of wear is determined and compared with a value representing the wear limit and stored in the computer. When the two values agree with one another, preferably within a specific tolerance band, an appropriate signal is given to the driver via a display to indicate that the maintenance work must be carried out.

For example, the lubricating capacity of the engine oil or the state of the brake linings can be adopted as a command parameter.

According to the process, the states of wear of other operating parameters, such as, for example, the clutch, carburetor setting, spark plugs, ignition times, battery voltage or the like, are detected, and corresponding values are fed to the computing unit which compares these with values stored in its memory and representing the wear limit and assigns them to a maintenance time determined by the command parameter.

By means of this new process, it becomes possible to define maintenance services as a function of actual states of wear, as a result of which relatively long maintenance intervals arise for a vehicle which is driven with care, whereas the maintenance intervals are shortened in the case of a vehicle subject to severe stress, so that the operating reliability of such a vehicle is then considerably increased.

According to a further embodiment of the process, it is envisaged that a load diagram is plotted by the computer from the values of operating parameters, which are criteria for the stress on the motor vehicle, this load diagram showing whether the vehicle is driven predominantly under partial load or under full load. In this case, ruling operating parameters can be the engine speed or the number of ignition cycles, and these are added up over a specific period of time or over a specific number of kilometers. The computer can then determine the stress on the vehicle by means of a plotted load diagram. This information is then used in an advantageous way, so that the time or mileage at which the wear limit will be reached, with a constant load on the motor vehicle, is extrapolated in the computing unit from the determined values. By making use of the information as to the load range in which the motor vehicle is driven on average, an extrapolated value of the wear limits both of the command parameter and of the other operating parameters can be determined as a result, and this extrapolated maintenance time can likewise be transmitted to the driver via the display so that he can see immediately when the maintenance work must be carried out, with the type of driving remaining the same. Consequently, he is immediately given an incentive to economically, since, when the drives his vehicle more carefully than before, he will see that the maintenance time can be deferred as a result of careful driving and, consequently, the maintenance interval can be lengthened.

It is advantageous if the operating parameters are assigned to the maintenance time of the command parameter within a tolerance band which depends on mileage count, fuel consumption, time or even a combination of these parameters, and the maintenance time within the tolerance band is fixed towards the upper or lower limits of the tolerance band, allowing for an evaluation of the command parameter and of the operating parameter. This tolerance band serves for finding an optimum balance between a necessary exchange of parts or maintenance of parts and shorter stays in the workshop. The evaluation as to whether the upper or the lower limit of the tolerance band is to be adopted as the criterion for fixing the maintenance time is carried out differently for the various operating parameters, depending on how greatly the state of wear of the particular operating parameter influences the operating reliability of the motor vehicle. Thus, for example, the operating parameter "brake linings" will be evaluated by approaching the lower limit of the tolerance band. On the other hand, with the operating parameter "carburetor setting" it is possible to approach the upper limit of the tolerance band.

The condition of the brake linings can also be adopted as the command parameter, in which case the lubricating capacity of the oil is to be considered as the operating parameter and is assigned, according to the other operating parameters, to the time of exchange of the brake linings, that is to say to the maintenance time. The parameter chosen as the command parameter will always be one which is primarily a criterion for the operating efficiency of the vehicle and which must be maintained at intervals which are shorter than those of the remaining operating parameters which are important for the operating reliability of the vehicle.

If the condition of the engine oil is used as the command parameter, it is advantageous if the condition of the engine lubricating oil is determined indirectly via the fuel consumption of the motor vehicle. This can be carried out, for example, in such a way that the fuel consumption of the motor vehicle is detected and is accumulated in the computer, and that a specific fuel consumption value is stored in the computer, and the computer determines the maintenance time as a function of the difference between the actual fuel consumption and a stored fuel consumption value. The fuel consumption can be detected simply and is a characteristic value for the lubricating capacity of the engine oil.

The states of wear of the operating parameters can be measured continuously, but they can also be measured intermittently at specific intervals. It is advantageous if the condition of operating parameters dependent on wear, which are determined non-continuously, is detected via at least two sensors per operating parameter, one of these detecting a specific intermediate value of the wear and the other the wear limit. The sensor, which is arranged so that it determines an intermediate value, for example a specific wearing of the brake linings which is, however, still a long way below the wear limit, then transmits a signal, which corresponds to the specific state of wear, to the computing unit which can, for example on the basis of the mileage covered until then, determine when the wear limit will probably be reached, in the case of a constant load on the vehicle. The sensor assigned to the wear limit is intended to indicate when the wear limit is actually reached, so that, if the extrapolated value does not correspond to the actual value, the danger can never arise that the true wear limit is not determined, which would result in impairment of the roadworthiness of the vehicle.

In a further embodiment of the process, the indication to carry out the maintenance service or the indication of the probable mileage count at which a maintenance service is to be carried out is given continuously during driving. By observing this display, the driver thus has the possibility directly of ascertaining which type of driving he must adopt to lengthen the maintenance intervals or defer the maintenance time. He is therefore given a direct incentive to drive economically.

However, it can also be envisaged to produce, at specific intervals of time, an indication to carry out the maintenance service or the indication of the probable mileage at which a maintenance service is to be carried out. This indication can also be given, for example, in dependence on the position of the ignition key. In any case, however, it is very advantageous if the condition of the monitored operating parameters can be displayed at the maintenance time, since it is then possible to see directly what additional maintenance work is also to be carried out.

The process will be explained in more detail below with reference to a computation example.

In this computation example, the lubricating capacity of the engine oil, which is measured indirectly via the fuel consumption, is adopted as a command parameter.

It is assumed that a motor vehicle has the following fuel consumption values at various average speeds:

| Urban Operation liters per 100 km | at 90 km/h liters per 100 km | at 120 km/h liters per 100 km | at 180 km/h liters per 100 km |
| --- | --- | --- | --- |
| 22 | 11.3 | 13.5 | 22 |

If it is assumed that an oil change interval of 10,000 km is fixed for urban operation, a consumption value of 2,200 liters is obtained, that is, at 10,000 km, 2200 liters of fuel will have been consumed. To calculate the corresponding kilometer meter maintenance limit at driving speeds of 90 km/h, the ratio of the consumption is employed, thus $$\frac{\text{urban consumption rate}}{\text{high speed consumption}} \times 10,000 \text{ km}$$

For 90 km/hr:

$$\frac{22}{11.3} \times 10,000 = 19,500 \text{ km}$$

If the value of 2,200 liters is taken as a limt value for the other consumption values also, then the following intervals arise by extrapolation:

| at 90 km/h | at 120 km/h | at 180 km/h |
| --- | --- | --- |
| 19,500 km | 16,300 km | 10,000 km |

As a result of the process according to the invention, the actual state of wear, that is to say, actual lubricating capacity of the oil, is taken into account because a consumption value of, for example, 2,200 liters is stored in the computer. By detecting the actual fuel consumption, that is to say, in this case, the value corresponding to the state of the command parameter, the computer can define the difference between the stored value, that is to say the value of 2,200 liters, and the average fuel consumption value required for covering a specific mileage and can determine from this at which mileage count a maintenance service or an oil change will probably have to be carried out, in the case of the type of driving remaining the same. This determined value can be transmitted to the driver via the display, so that he sees directly that, for example, at an average speed of 90 km/h, he does not have to carry out the next maintenance service until a higher mileage count has been reached than is the case when he drives at a speed of 180 km/h. He is therefore given a direct incentive to drive economically.

Depending on the state of wear of the other operating parameters, the maintenance of these is assigned to the maintenance time determined via the command parameter, and this takes place within a specific tolerance band. Consequently, when a consumption of 2,200 liters has been reached, the state of wear which, for example, the brake linings have reached is indicated by the computing unit via the display. If, for example, the state of the brake linings has worsened by 40% since the last maintenance service was carried out, it can be assumed that the brakes will maintain their operating efficiency until the next maintenance service is reached. In this case, it would therefore be unnecessary to replace the linings. If, on the other hand, the brakes have deteriorated by 70%, for example, that is to say, if they have approached to within 30% of the wear limit, then replacement of the brake linings can no longer wait until the next maintenance service. When the stored value of the command parameter, which should be reached so as to carry out the maintenance service is fixed, this can take into account a tolerance band which can be determined arithmetically as a function of the state of the operating parameters. This results in an interval which serves for finding an optimum balance between a necessary exchange of parts and less frequent stays in the workshop.

By using the process to define the maintenance times as a function of the actual wear of a command parameter to which further operating parameters are assigned, a maintenance interval can be lengthened to twice the value, with an appropriate type of driving. As a result of this and because maintenance work dependent on wear is carried out at the same time, the availability of the vehicle to the driver is increased. For example, a reduced oil consumption can arise over the total operating period of the vehicle, if the lubricating capacity of the oil is used as a command parameter since an oil change will then always be carried out only when this lubricating capacity actually necessitates an oil change.

An object of the invention is to provide a process for determining maintenance and servicing intervals, which, when applied, makes it possible to represent better the actual states of wear of operating parameters, and thereby to enable maintenance and servicing work to be carried out when this is actually necessary.

Another object of the invention is to produce a method of indicating maintenance and service intervals for vehicles, both motor and other, wherein a maintenance alarm is indicated when a sensed value of a command parameter substantially equals a pre-established limit value therefor.

It is a further object of the invention to produce a method of indicating maintenance and service intervals for vehicles wherein a maintenance alarm is indicated for a vehicle operating parameter when the sensed value thereof substantially equals a pre-established percentage of a limit value of the operating parameter and, after a maintenance interval alarm has been signalled for a command parameter.

It is a further object of the invention to produce a method of indicating maintenance and service intervals for vehicles where the intervals for performing maintenance and service for plurality of operating parameters are compared with the interval for a command parameter and indications for maintenance and service for one or more of the operating parameters are presented at the time maintenance and service is indicated for the command parameter.

It is a further object of the invention to generate load diagram data as a criteria of the stress on the motor vehicle, the data being employed in generation of the alarms for maintenance and service intervals for command and operating parameters.

It is another object of the invention to generate one or more extrapolated limit values based upon an initial limit value for command and operating parameters, the extrapolated data being displayed.

It is another object of the invention to generate two limit values for each command and operating parameters defining a tolerance band which depends on at least one of mileage count, fuel consumption, time and a combination of these variables, the maintenance time within the tolerance band being fixed towards the upper or lower limits of the tolerance band depending upon an evaluation of the command parameter and of the operating parameter.

It is a still further object of the invention to produce a method of indicating maintenance and service intervals wherein the command parameter employed depends upon one of the condition of brake linings and engine oil.

It is another object of the invention to produce a method of indicating maintenance and service intervals wherein a command parameter constitutes condition of engine oil which is indirectly determined from fuel consumption of the motor vehicle.

It is a still further object of the invention to produce a method of indicating maintenance and service intervals for vehicles wherein fuel consumption of the vehicle is detected and accumulated in a computer, the latter storing a specific value for consumption, the computer determining the difference between the specific value and the actual detected value to determine a maintenance time as a function thereof.

It is a further object of the invention to produce a method of indicating maintenance and service intervals for vehicles wherein the condition of operating parameters and a command parameter is detected by way of sensors, the data from which is input to a computing unit.

It is a further object of the invention to produce a method of indicating maintenance and service intervals for vehicles wherein the condition of operating parameters dependent on wear are determined intermittently, detected by way of at least two sensors per operating parameter, one of the sensors detecting a specific intermediate value of the wear and the other detecting the wear limit.

It is a further object of the invention to produce a method of indicating maintenance and service intervals for vehicles wherein the indication to carry out maintenance work or the indication of the probable mileage reading at which maintenance work is to be carried out is continuously given during driving.

It is a further object of the invention to produce a method of indicating maintenance and service intervals for vehicles wherein the indication to carry out maintenance work or the indication of the probable mileage reading at which maintenance work is to be carried out is given at specific intervals of time.

It is a further object of the invention to produce a method of indicating maintenance and service intervals for vehicles wherein the indication to carry out maintenance work or the indication of the probable mileage reading at which maintenance work is to be carried out is given in dependence on the position of the ignition key.

It is another object of the invention to produce a method of indicating maintenance and service intervals for vehicles wherein, after the maintenance work has been carried out, data indicating the completion of the maintenance work is input to a computer to correct the stored information and indications thereof.

It is another object of the invention to produce a method of indicating maintenance and service intervals for vehicles wherein the condition of operating parameters can be indicated during maintenance operations.

It is a further object of the invention to produce an apparatus for indicating maintenance and service intervals aboard vehicles wherein sensed values of a command parameter and operating parameters are input to a computer which, in accordance with stored limit values for the command parameter and operating parameters, outputs to an indicator signals that maintenance is necessary on a command parameter and one or more operating parameters depending upon whether limit values for the command and operating parameters have been reached.

These and other objects, features, and advantages of the present invention will become more apparent from the following description when taken in connection with the accompanying drawings which show, for the purposes of illustration only, one embodiment in accordance with the present invention, and wherein:

FIGS. 3A-3I shows the program steps for carrying out features of the invention.

Figure 1:
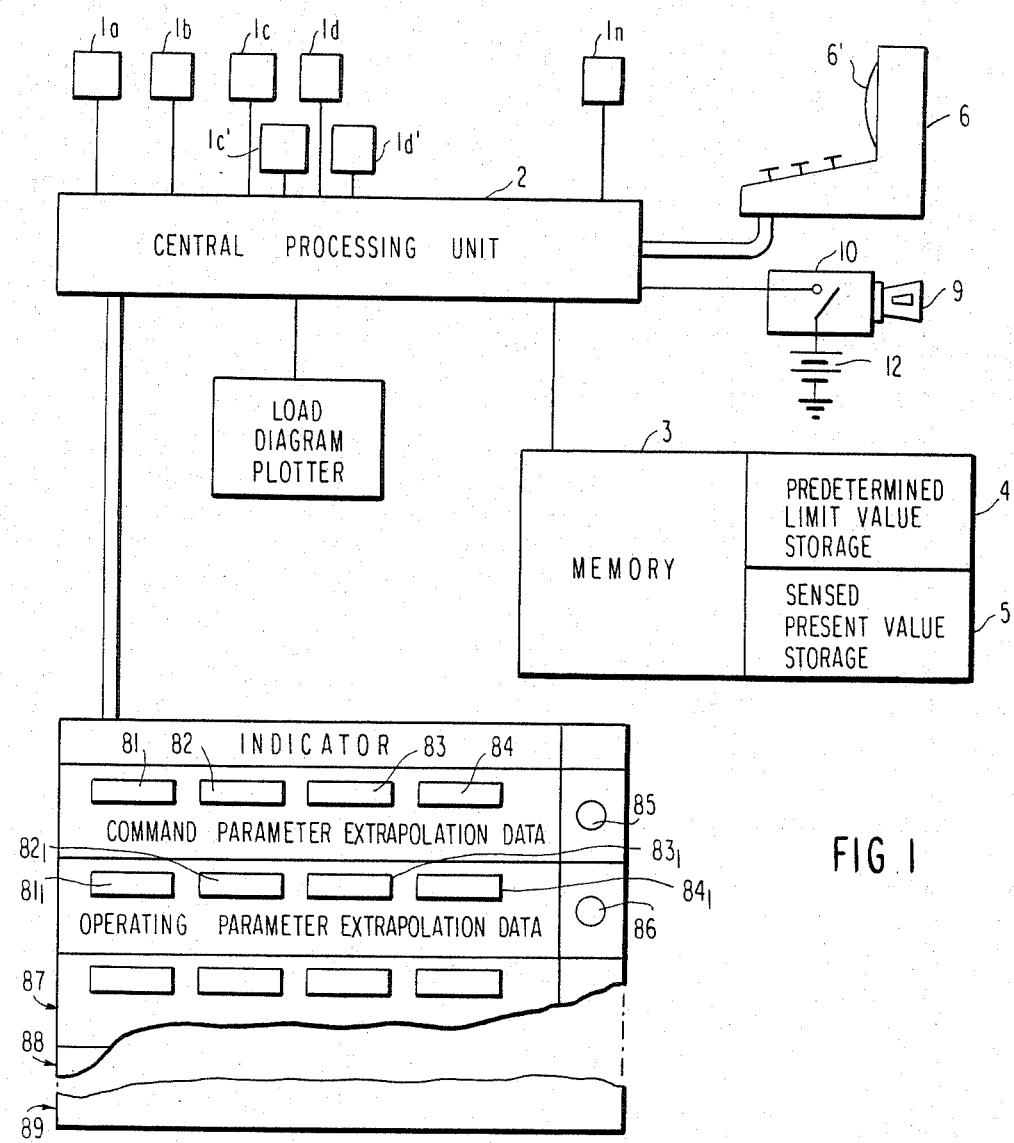
FIG. 1 is a block diagram of the invention showing sensing, data input and processing system with indicator.

Turning now to a consideration of FIG. 1, wherein like reference numerals correspond to like structural elements, the invention comprises a series of command parameter and operating parameter sensors $1a-1n$. Each sensor is designed to sense mechanically the amount of consumption or wear of the specific parameter involved.

The parameters, as previously pointed out, may include fuel consumption, clutch wear, carburetor setting, spark plugs, ignition times, battery voltage or the like and distance travelled. Essentially, the sensing is an analog operation which may be translated to an electrical signal, by means well known to those skilled in the art, and presented to the central processing unit 2.

For some parameters two sensors are shown, for example, $1c$ and $1c'$ and $1d$ and $1d'$. The first sensor for the parameter serves to sense a limit value, for example, sensor $1c$, while the second sensor $1c'$ serves to sense an intermediate value.

The central processing unit 2 may take any one of a variety of conventional architectural configurations known to those skilled in the art. Manifestly it must include I/O ports to accept the analog signals input from the sensors $1a-1n$. It accepts input from keyboard 6 and also a signal from the ignition key. It is capable of the four arithmetic functions and the usual logical functions. It may have, resident, operating system programs with attendant housekeeping programs which serve to process the programs which carry out the operations of the invention.

The latter may be programmed in any one of the higher level languages such as FORTRAN or BASIC but characteristically such programming may be carried out in the machine language of the particular machine selected in order to achieve the well known economies of speed and minimal storage attendant machine language programming.

The central processing unit 2 produces output and accepts input from the memory 3. A load diagram plotter 7 may accept output from the central processing unit. Characteristically, in accordance with the invention, the load diagram data may be retained internally for data processing without display.

Memory 3, in addition to providing storage for operating system programs and storage incident to ongoing data processing, stores two groups of values. Element 4 is representative of data input, via keyboard 6, of predetermined values for command and operating parameters. In addition to inputting single limit values for a particular parameter, two values may be input, an upper and lower limit value, the two values defining a tolerance band, the values indicated as stored at 4 are those values used as reference values against which sensed values are compared. Such predetermined values remain fixed until changed, either by data processing or by subsequent input from keyboard 6.

Block 5 is representative of present values of sensed parameters received from the sensors $1a-1n$ and allocated to memory by the central processing unit 2. During the course of operations, the central processing unit continually polls all of its inputs $1a-1n$, 6, 9 and 3 for the purposes of inputting new data.

In order to effect translation of the mechanical sensed values for sensors $1a-1n$, it will be apparent to those skilled in the art that the conventional battery voltage available aboard the vehicle, 6, 12 or 24 volts, will be available so that the range of mechanical movement, for example, brake shoe movement during wear, may be translatable into a voltage range between, for example, 0-24 volts, for presentation as an output of the sensor to the central processing unit 2. In the polling operation, the central processing unit 2 effects an analog to digital conversion changing the electrical value presented by the sensor into a digital value congenial to the operation of the central processing unit 2 and its attendant programs. It is these digital values for the sensed parameter values derived from $1a-1n$ which are stored in element 5 of the memory by the central processing unit 2. As each sequential polling takes place, it will be appreciated that new values representing changed parameters will replace those already stored at 5 for the corresponding parameter. It will be seen therefore that whereas the values stored at 4 change only intermittently, as for example by new inputs from 6, the values in 5 change, for the most part, continually as the sensors $1a-1n$ provide updated data.

It is expedient, within the ambit of the invention, to store a plurality of sensed values for any given parameter in storage 5, deleting older data only as it becomes no longer useful in the calculation. Thus, where, for the purposes of generating load diagram data, a series of sensed values, each representing the value of the parameter at a different point in time, may be desirable, then the series of sensed values may be retained in storage 5 until it is determined that, for example, the oldest value is no longer necessary, after which time it may be replaced by the incoming newly sensed value for that particular parameter.

Keyboard 6 may be alpha-numeric in character. It is used for inputting limit values of command and operating parameters. This may consist of a single limit value or, alternatively, may consist of two limit values defining a tolerance band therebetween.

The number and character of driving conditions, urban, 90 km/h, 120 km/h and 180 km/h and the like may be designated by input at keyboard 6.

Keyboard 6 may also be used to indicate to the system that certain maintenance operations have been performed. Thus, for example, if the present sensed value for engine oil condition stored in 5 has reached values which fall within the tolerance band of values stored for engine oil condition in storage 4, which condition has resulted in a maintenance or service indication at indicator 8, and if oil has been changed, keyboard 6 may be used to input data representing the performance of the oil change which may be used to reset the sensed values stored in storage 5 to 0. Thereafter as vehicle operation continues, engine oil condition values stored in 5 will increase from 0 in a repetition of the earlier cycle. Ignition key 9 may serve as an input control, employing as previously explained, a battery voltage, to cause indications to be presented, for example, for a limited time on indicator 8 after the vehicle is started for driving. Thus, for a period of, say, ten seconds, the indicator 8 will turn on so that the vehicle operator may determine the status of the command and operating parameters to determine whether maintenance is presently required or will be required in the near future.

Keyboard or console 6 also allows entry to any register within the CPU 2. For example, as successive refuelings take place, it is appropriate to carry the total amount of fuel input as a standing value in a register, the total fuel input since the last maintenance period. Thus, to determine the total amount of fuel used since the last maintenance service was performed, the value standing in such a total fuel input register would have subtracted from it, the amount of fuel remaining in the fuel tank as sensed by the sensor for the purposes of determining fuel consumed, a data element to be employed in generating command and operating parameter extrapolation figures.

Alternatively, the fuel consumption sensor input may be used as input within the CPU 2 to a mono directional counting chain whereby, regardless of the number of refuelings, only the decrease of fuel in the fuel tank is recorded, thereby registering total consumption since the last performance of maintenance.

Central processing unit 2 upon receipt of a signal from ignition key 9, may set in operation a timing sequence during which the indicator 8 is turned on and, after the timing out of the timing sequence, the central processing unit will turn the indicator 8 off, if during the conventional processing, no indication would normally be presented. Manifestly if the system has determined that maintenance operations are already due, indicator 8 will so indicate.

Central processing unit 2 may also include a clock and counter timing chains which can register the passage of time. Such counter chains are used to register time periods for the purpose of generating load diagrams.

Figure 2:
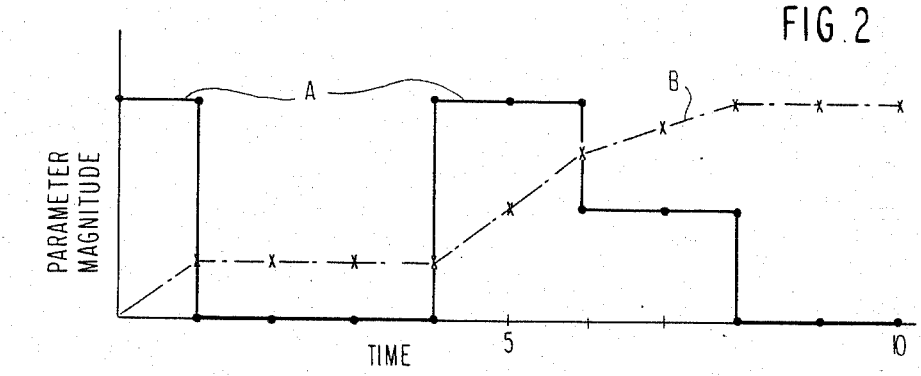
FIG. 2 shows a load diagram.
Figure 3A:
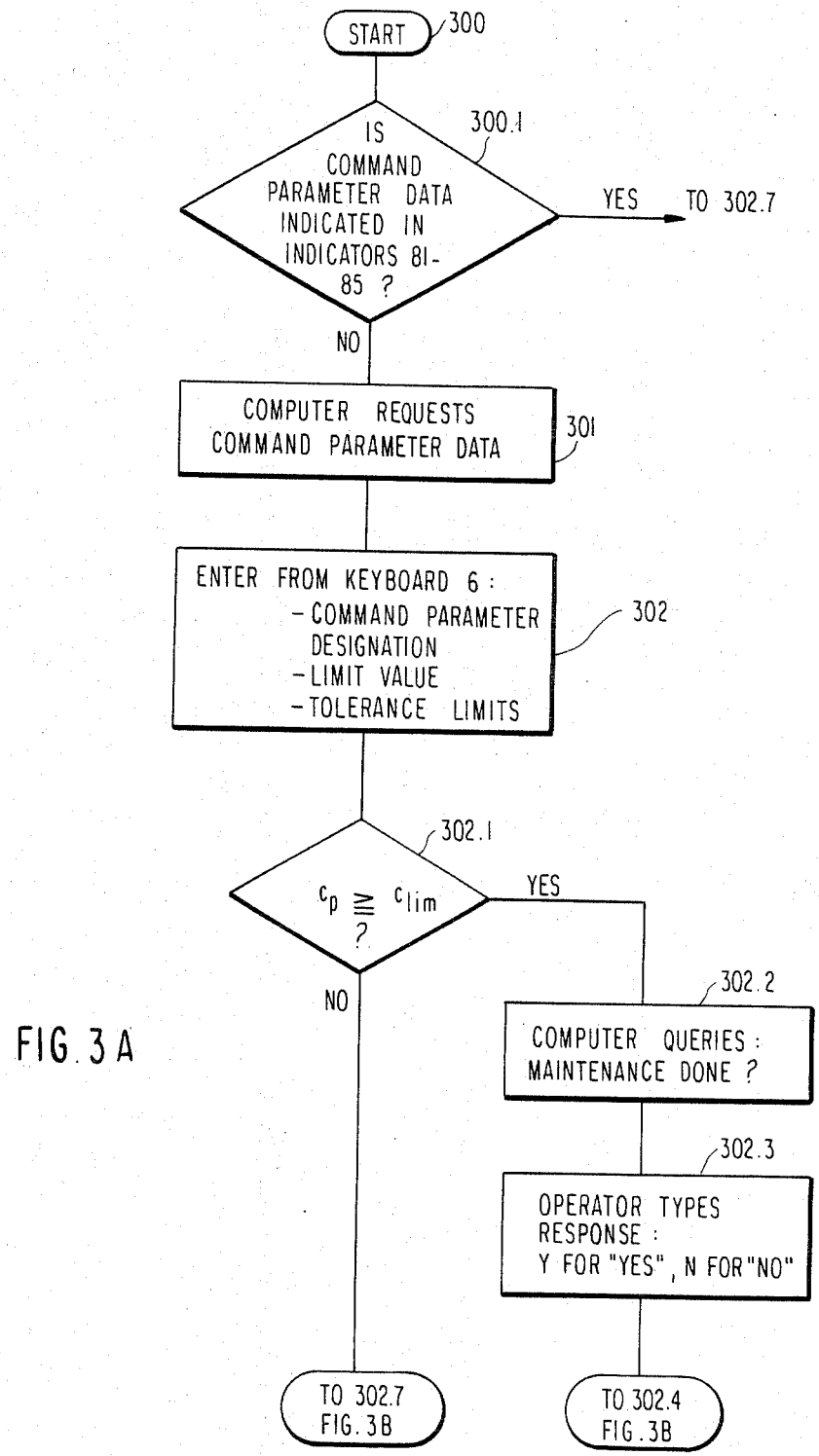
Figure 3B:
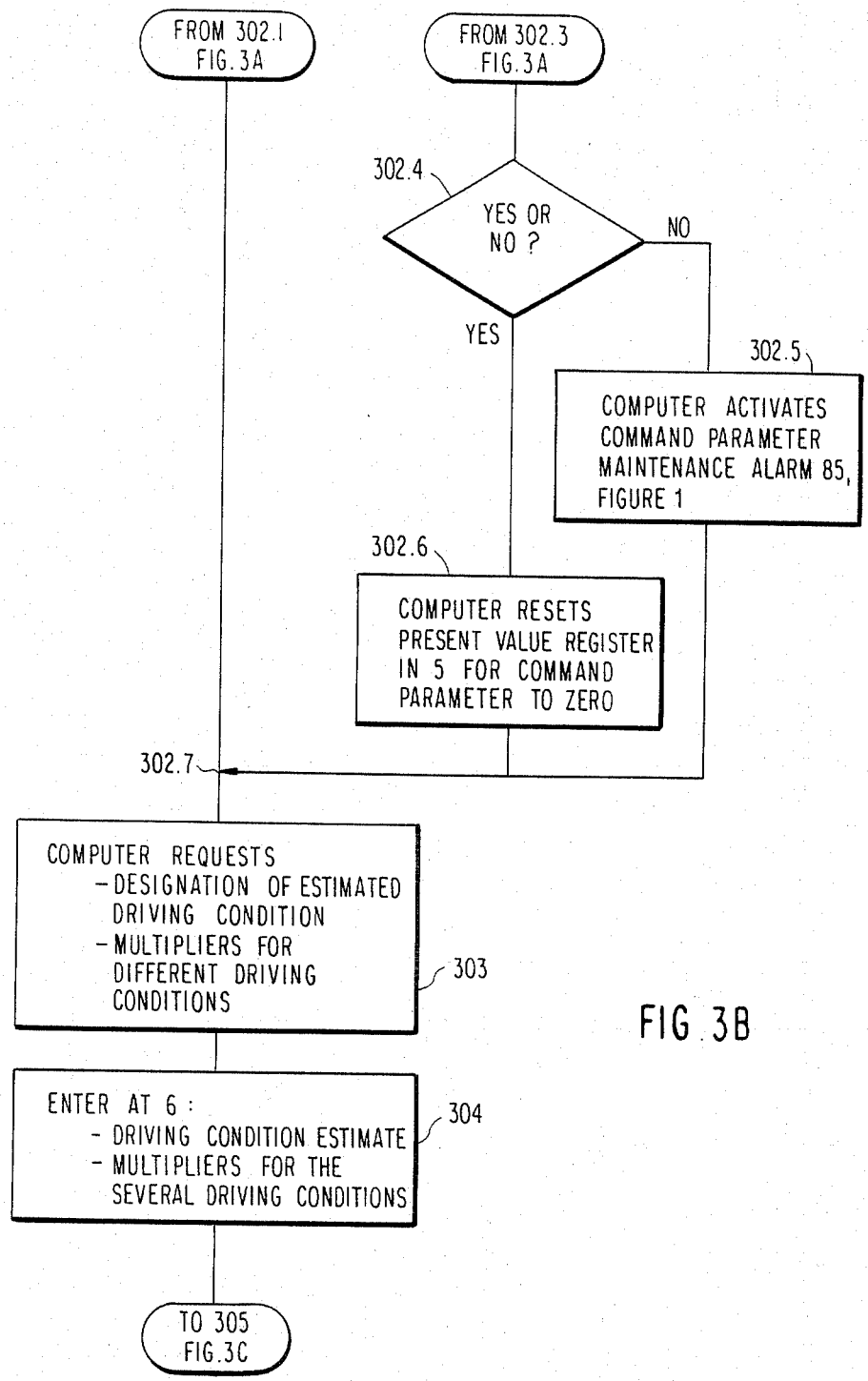
Figure 3D:
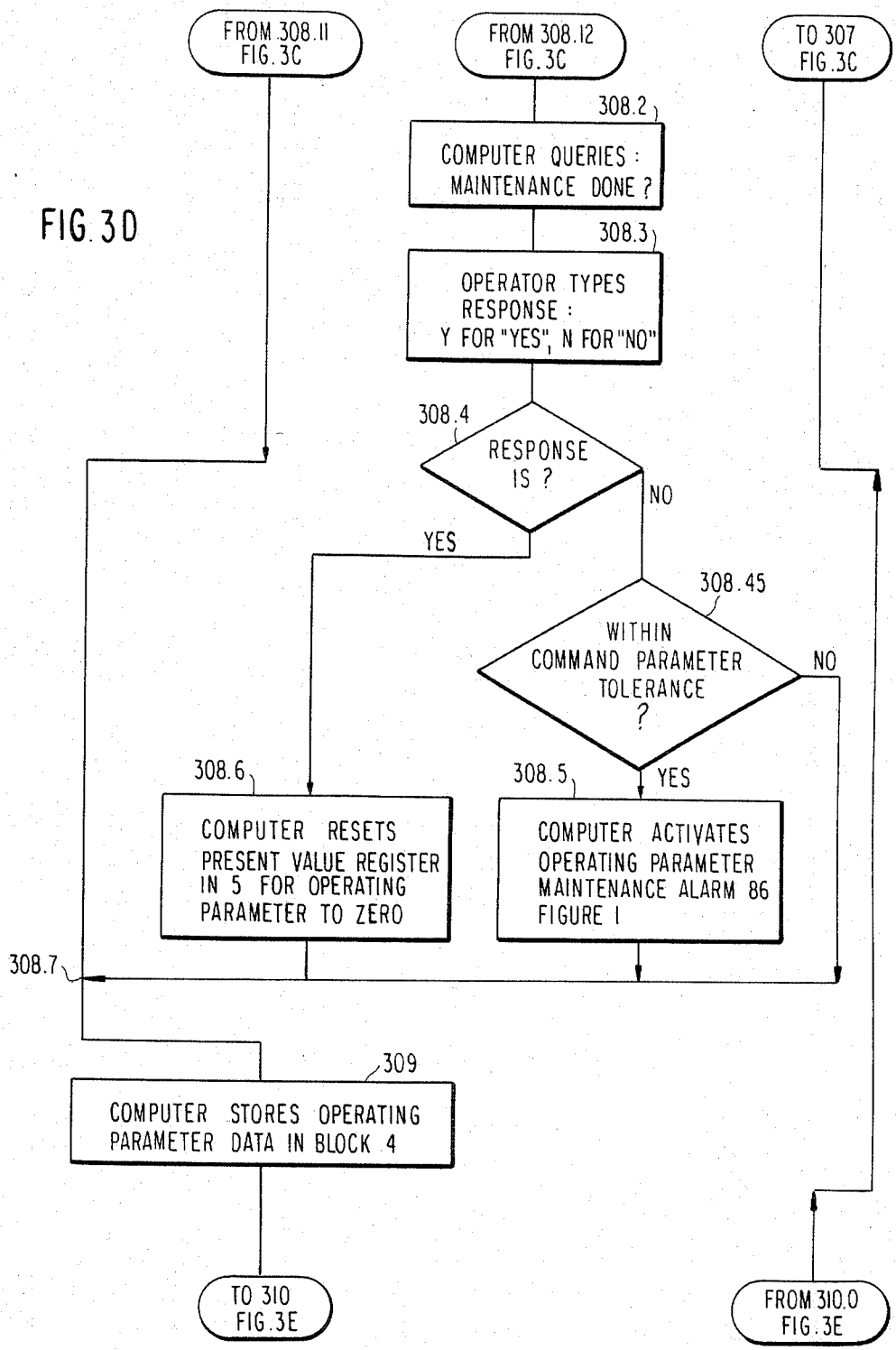
Figure 3E:
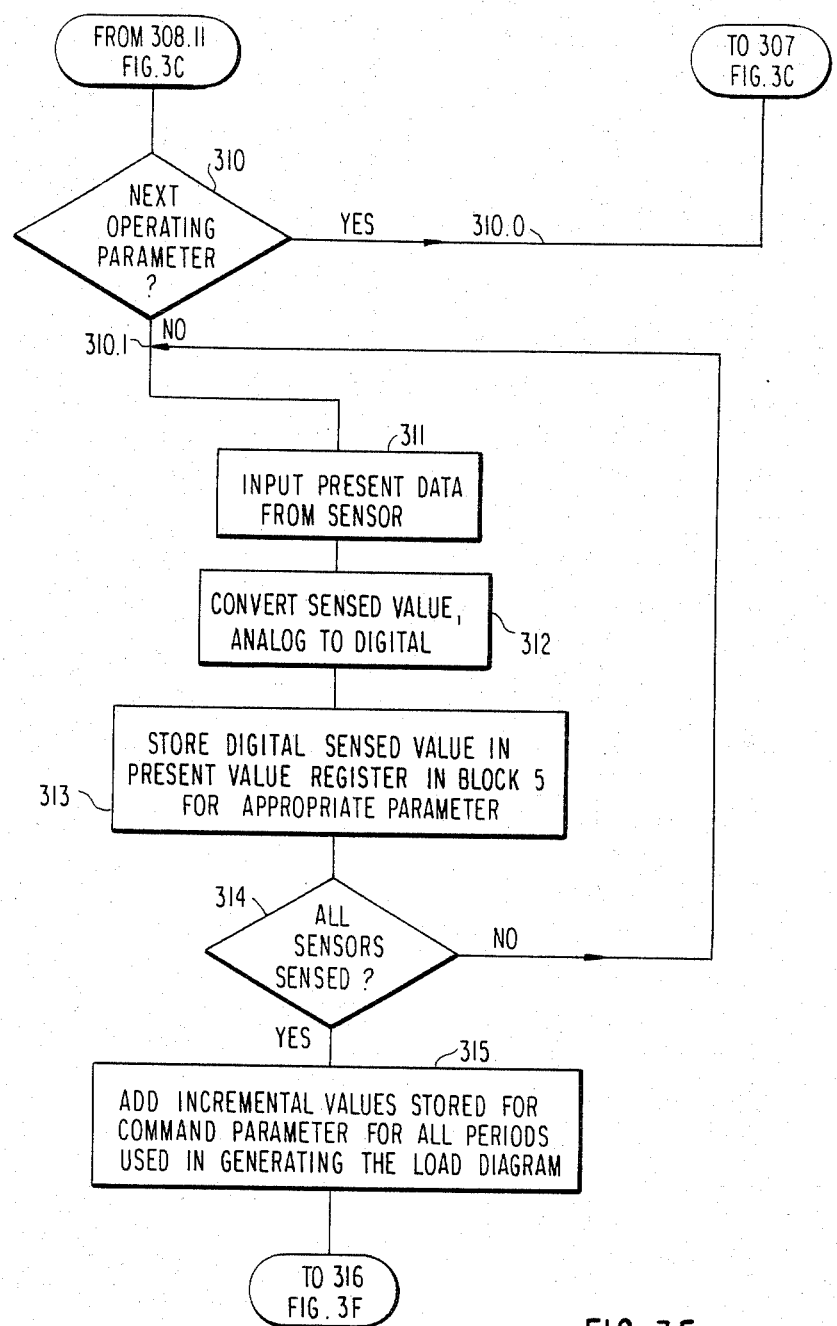
Figure 3F:
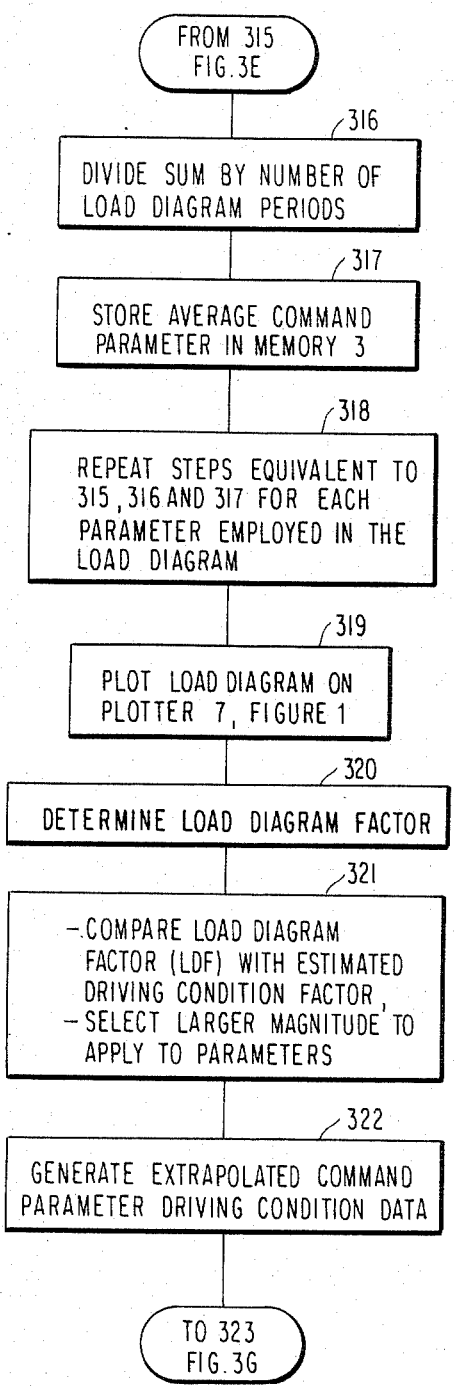
Figure 3G:
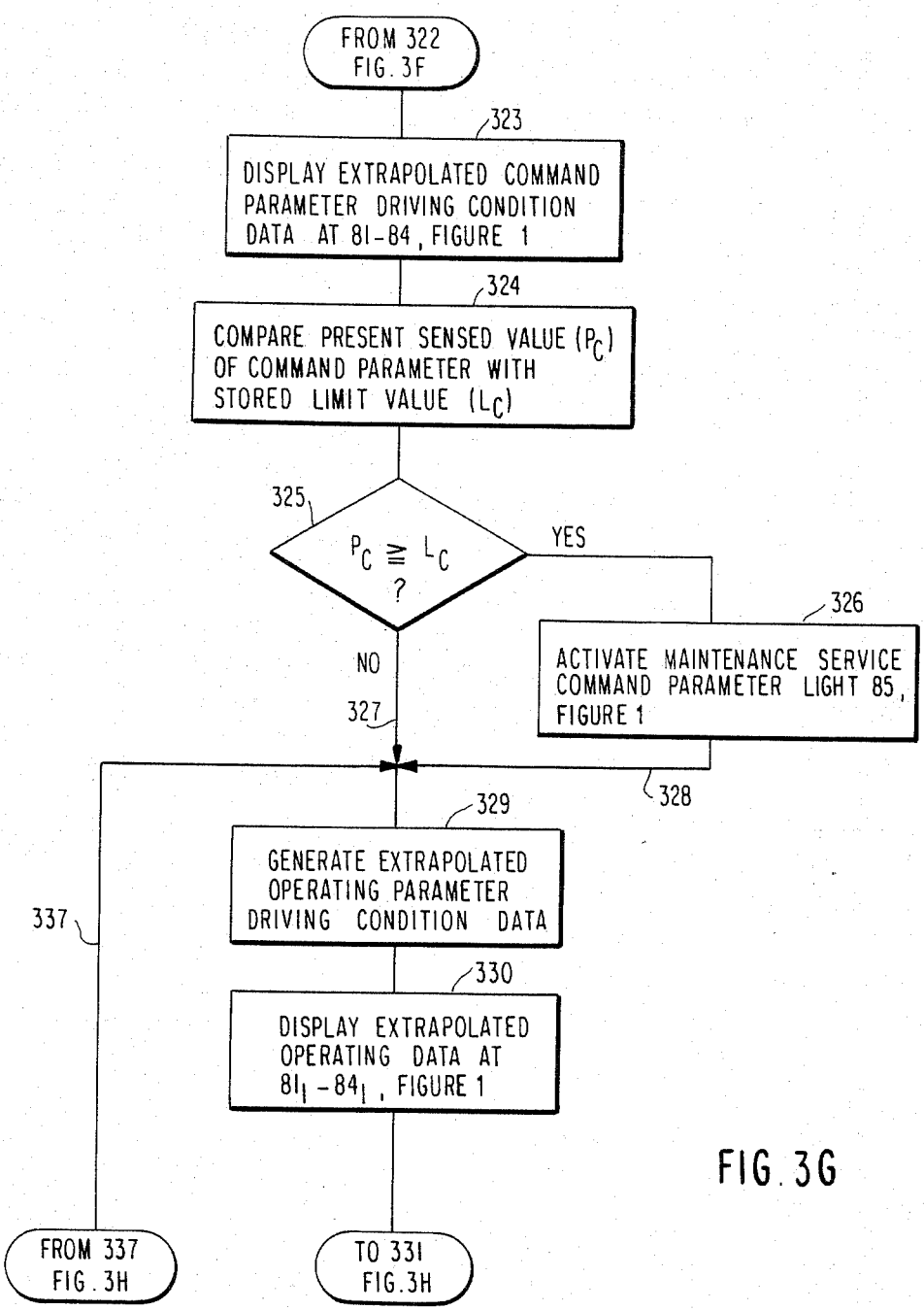
Figure 3H:
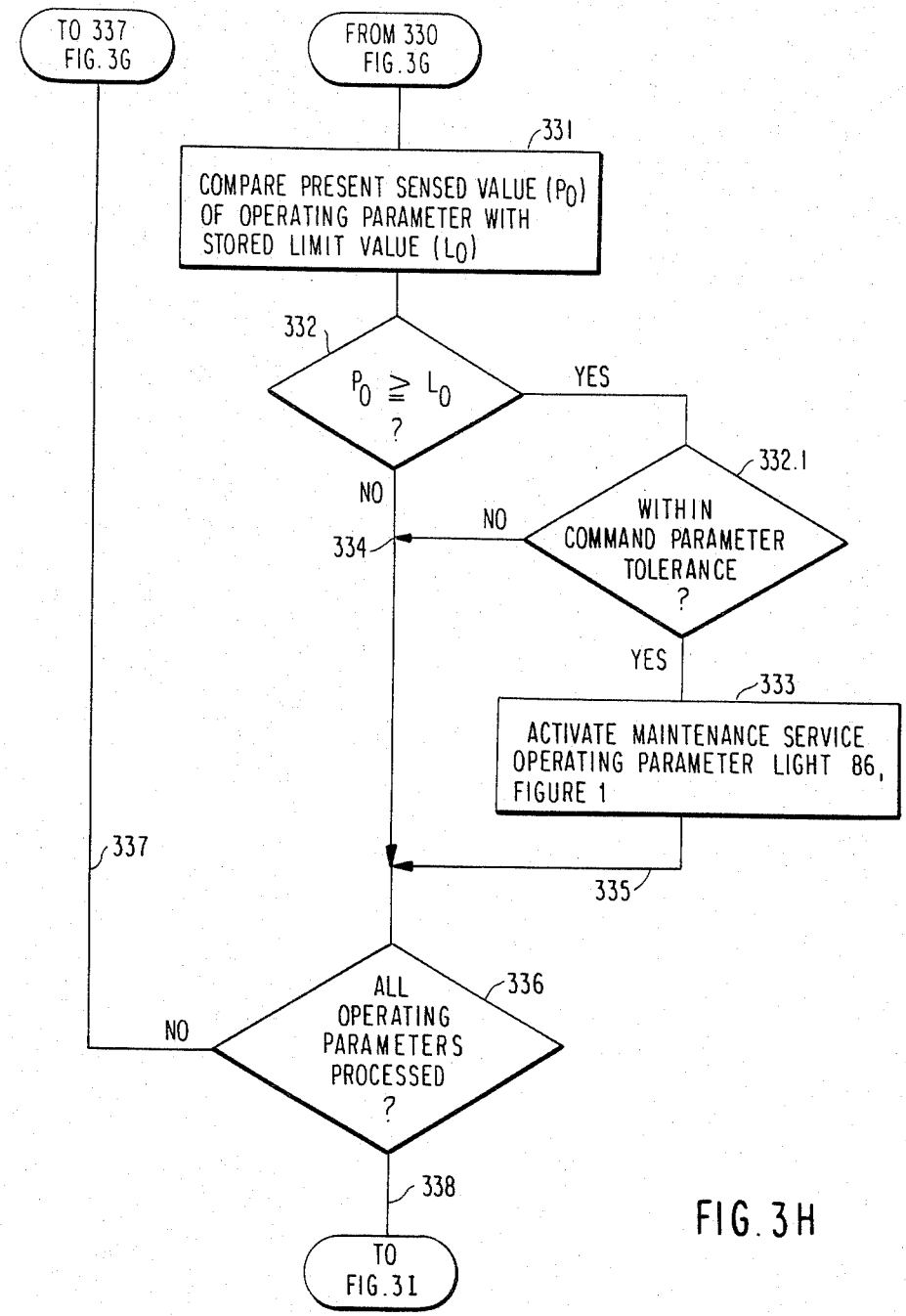
Figure 3I:
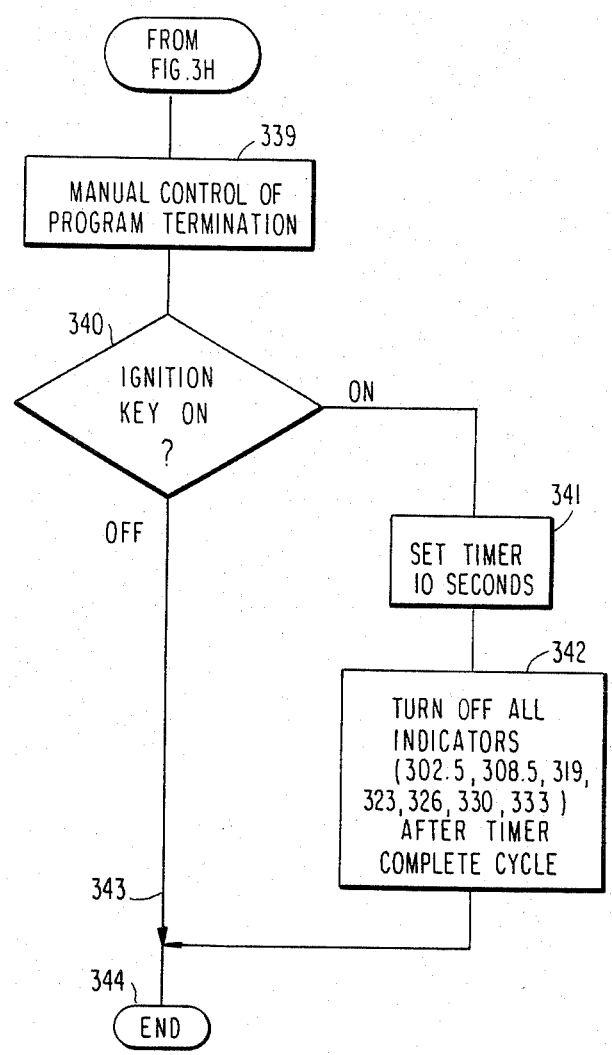

FIG. 2 shows a load diagram of time as an abscissa against parameter magnitude as an ordinate. Data for selected command and operating parameters may be represented at sequential points in time. The time periods may be appropriate to the operational activity of the vehicle in question. Thus, for a commercial vehicle operating for 14-18 hours per day, time periods may be short, a few hours, whereas for a personal vehicle subject only to intermittent driving, time periods of a day or week might be appropriate.

For the example shown, graph A in solid lines, may represent fuel consumption for the vehicle. Thus, values for consumption vary between an upper or full load value through time instant 1, to 0 for instants 2 and 3, full load at 4 and 5, half load at 6 and 7 dropping to 0 through 8 and 9. Data representing the status for each of the time instants, that is, data for 10 instants, would be stored for this parameter in present value storage 5.

A second parameter B, shown with a different arbitrary ordinate scale, for example, may represent ignition cycles, during the same time periods. This shows a rise linearly through period 1, with no operation through periods 2 and 3 and continuing the rise in cycle count through periods 4 and 5 and due to half speed operation at 6 and 7 proceeds at a different rise rate and then shows no further elevation between points 8 and 9. This data also would be stored for all periods recorded in present value storage 5 for use in calculating load diagram data.

The load diagram of FIG. 2 may be displayed on a plotter which may take the form of a cathode ray tube, LED (Light Emitting Diodes) or LCD (Liquid Crystal Display) display or alternatively, if desired, may be a paper output display. Alternatively, the data may be generated within the CPU 2, remaining there without visible display for use in determining the extent to which the present values of parameters are effectively approaching their respective limits.

Thus, CPU 2, by programming, may be provided with an algorithm which will employ the load diagram data to modify the present value data to shorten or lengthen the time before an indication of maintenance and service is necessary.

Employing the example shown in FIG. 2, fuel consumption A may be averaged over the ten periods wherein its average value, for the graph shown, would be $$Fuel_{AV} = \frac{1 + 0 + 0 + 0 + 1 + 1 + 1/2 + 1/2 + 0 + 0}{10} =$$

$$\frac{4}{10} = 0.4$$

From this it follows that the activity of the vehicle is at less than ½ so that maintenance periods may be extended if desired. Such a numerical result, $F_{AV}=0.4$ may be used as a modifier of the operating parameter command parameter limit for the purposes of extending the time before which maintenance is required.

The explanation given with regard to fuel consumption and the graph A is exemplary only and it will be appreciated that other operating or command parameters may be used either singly or in combination, related mathematically as desired. By the same token, while data has been indicated for the respective graphs A and B, as being for particular instants in time, it will be appreciated that the data may be gathered and summed internally over the period, or averaged over the period, as desired rather than being sampled on an instantaneous basis.

Central processing unit 2 outputs data to indicator 8 which shows, for each command and operating parameter, the designated limit value and extrapolated limit values for each driving condition. Thus, for a command parameter, for example, fuel consumption, 10,000 km may be indicated at 81 representing urban operation, at 82, 19,500 km would be entered for driving speeds of 90 km/h, at 83, 16,300 km would be indicated for speeds of 120 km/h and at 84, 10,000 km for speeds of 180 km/h.

If the CPU 2, in its calculations according to its program has determined that maintenance for that particular parameter is due, an alarm light 85 is activated.

While the indicator 8 has been disclosed as being composed of separate lights such as 85 together with multi-digit indicators such as 81–84, it will be appreciated that the mode of implementation is not critical but may take the form most expedient for the particular application. Thus, in some instances, a cathode ray tube display printing out the information for the indications 81–85 may be appropriate together with the designation of the parameter or the indicator 8 may take the form of LEDs or LCDs if desired.

FIG. 3 now will be described as one manner in which the invention may be practiced employing the CPU 2 and its attendant peripherals. It will be appreciated by those skilled in the art that the steps set forth are exemplary only and may be modified as particular circumstances may dictate without departing from the spirit of the invention.

For the purposes of explanation in connection with FIG. 3, as an example, oil change interval will be assumed as a command parameter and brake lining wear will be employed as a representative operating parameter, the latter having two sensors, 1c which records the half-way wear condition and 1c' which records the full wear condition. It will be appreciated that, alternatively, a single sensor may provide a continuous mechanical signal which, after analog to digital conversion may be compared against two magnitudes representing the half-way wear condition and full wear condition to generate concomitant alarm signals.

At the start of the program, the CPU 2 seeks to determine command parameter data. If such data has already been entered and command parameter extrapolation data has already been generated therefrom, such data will be standing in the registers of the CPU. In such a case there is, of course, no need for the CPU 2 to query the keyboard 6, e.g., the vehicle operator, for further command parameter data. As indicated in block 300.1, a response input by the operator at keyboard 6 of YES directs the procedure to point 302.7. In case the response input by the operator is NO, the computer proceeds to request command parameter data as in block 301. This may be seen by the operator, as for example, by an alerting light 6', FIG. 1.

The alpha-numeric display for keyboard 6 may be a cathode ray tube, CRT, LED or LCD console display.

Thus, while shown as a single light, 6' may in fact be an alpha-numeric display which actually queries by words for phrases. The means for effecting such displays is, of course, well known to those skilled in the art of interactive computer display programming.

Upon being alerted at step 301, the operator enters at keyboard 6 a command parameter designation which may be by alpha-numeric keys. For example, some designation such as the letters "OC" for "Oil Change" may be entered, the distance limit, 10,000 km and tolerance limits therefor, for example, minus 200 km and plus 200 km.

The computer will, of course, signal by individual query for each data element requested.

Upon receipt of the limit value for the command parameter, the computer at step 302.1 compares the value standing in the command parameter present value $C_p$ register of block 5 (representing a value send by a sensor) with the limit value $C_{lim}$ newly entered at the keyboard.

If $C_p \geq C_{lim}$, the computer at 302.2 queries whether maintenance has been done.

The operator at 302.3 must acknowledge by a typed Y or N as YES or NO respectively.

At 302.4, the computer notes the response.

If NO is the answer, the computer, at 302.5, activates the maintenance alarm light 85, FIG. 1, for the command parameter.

If YES is the answer, the computer, at 302.6, resets the present value register in block 5 to zero thereby beginning a new maintenance cycle for the command parameter.

If NO is the answer at step 302.1, and upon completion of either of steps 302.5 and 302.6, the system proceeds to step 303 via point 302.7.

At step 303, the computer requests designation of estimated driving condition, that is, urban driving, 90 km/h, 120 km/h or 180 km/h. It will be recognized that these driving conditions are used for explanation purposes only and may take other magnitudes or characteristics as circumstances will require, without departing from the spirit of the invention.

Further, it will be appreciated that, by means of the load diagram feature described previously, a driving condition characteristic may be developed which may be used in lieu of an estimated driving condition if desired. This matter will be addressed later in the explanation.

The computer also requests, at step 303, the multipliers for different driving conditions.

In response thereto, step 304, the operator will designate a driving condition by a an alpha-numeric designation selecting one of the four driving conditions previously described, for this example.

Additionally, the operator will enter selected multipliers, for example, 22, for urban driving, 11.3 for 90 km/h, 13.5 for 120 km/h and 22 for 180 km/h as previously explained.

Block 305 is representative of a request by the computer and entry at keyboard 6 of special factors, if any are required. Such factors may be the interrelationship, by some algorithm, addition, multiplication or the like of multiple parameters employed in the load diagram or, alternatively, an additional factor by which the load diagram factors are modified before being applied to the command and operating parameters.

At block 306, the computer stores the data entered. It will be appreciated that the command parameter data, relating to limits, is stored in storage block 4.

If operating parameter data is standing in the memory registers 4 and 5, there is no need to request further operating parameter data and, as shown in block 306.1, the procedure advances to point 310.1. If the answer is NO, the computer queries the console 6 at block 307.

The computer now requests operating parameter data at block 307. As the query from the computer for each data element is presented at keyboard 6, the operator enters the operating parameter designation, an alpha-numeric code, for example, and the limit value or values for the operating parameter in question as shown at block 308.

As previously indicated, the brake lining wear characteristic has been selected as the representative operating parameter. Thus, two limits, one for half wear and one for full wear may be entered.

It will be appreciated that inasmuch as any number of interim limits may be designated for a particular operating parameter, the computer can query successively for a new value limit after each value limit is entered and will continue to do so until encountering a negative response, for example, a typed NO at which time the computer proceeds to step 308.1.

It will be appreciated that values of the parameters sensed by the sensors $1a$–$1n$ represent physical quantities which are related to particular parameter rates of consumption or wear in terms of distance traveled, e.g., kilometers, but are not individually, as sensed, in kilometers.

In order that the sensed values in registers in memory 5 correspond dimensionally to stored parameter limit values in kilometers, scale factors must be used to multiply the actual values sensed in order to obtain data representative of distance traveled. Such scale factors are entered, for example, at block 307.

For example, if measurement of brake shoe movement shows a value of 0.08 cm, as sensed, and a wear scale factor for brake shoes of 0.01 cm per 1,000 km of distance traveled is known, the latter scale factor will be entered by way of keyboard 6 when queried by the CPU 2 at block 307.

The computer, during sensing, multiplies the sensed value by the scale factor to obtain a value in kilometers to be stored in memory 5 for future use in comparison with parameter limit values. That is to say, the value sensed for brake shoe wear has been translated by the scale factor into a form representative of distance traveled in kilometers.

in step 308.1, the computer tests the value standing in the operating parameter register for present value $O_p$ against the largest of the limit values entered for the particular operating parameter most recently, $O_{lim}$. If $O_p$ is equal to or greater than $O_{lim}$, a condition representing that it is time for maintenance to be performed, the computer queries the console 6 with "maintenance done?", step 308.2. The operator responds with a typed "Y" or "N". If the answer is NO, at 308.4, the computer, at 308.45 tests whether the operating parameter sensed $O_p$ in kilometers standing in the memory 5 for that parameter falls within the tolerance band stored for the command parameter. If the answer is YES, the computer at 308.5, activates the operating parameter maintenance alarm 86, FIG. 1. If the answer is NO at 308.45, the procedure advances to point 308.7.

If, on the other hand, maintenance has in fact been performed, the response YES at 308.4 activates the computer to reset, at 308.6, the present value register in block 5 for the operating parameter to zero, thus conditioning the present value register to begin a new maintenance cycle.

A response of NO at step 308.1 or a completion of steps 308.5 or 308.6 returns the procedure via 308.7 to step 309 where the computer stores the operating parameter data in block 4.

Inasmuch as there may be a plurality of operating parameters, the computer, at step 310 queries the keyboard or console 6 for a next operating parameter. Upon receipt of a YES response, control is returned to step 307 to request the operating data and the steps 307 through 309 are repeated for each succeeding operating parameter.

Upon receipt of a NO response from the console 6, the computer is now in a position to enter new data from the various sensors $1a$–$1n$ and proceeds at step 311 to enter data from the first sensor. At step 312, the analog value sensed is converted to a digital form. Those skilled in the art will recognize that the A/D converter may be a separate element, part of the sensor or, alternatively, the central processing unit may accept the analog signal at the corresponding port of the central processing unit and perform the A/D conversion internally in the central processing unit.

The digital form of the sensed data is stored, at step 313, in the present value register in block 5 for the appropriate parameter.

Inasmuch as a plurality of parameters, the command parameter and several operating parameters, may be employed, the computer proceeds sequentially to accept data from each sensor as shown by block 314. At this point, the system is in a position to generate data for the load diagram. It will be remembered that, as discussed in connection with the load diagram, a plurality of values for each parameter involved in the load diagram generation may be stored in a plurality of present value registers in block 5 of memory. The example employed for FIG. 2 contemplates data collected for ten separate time periods. The total number of time periods employed for the load diagram, it will be appreciated, is a matter which may vary for detailed circumstances of a particular system and the number 10, as employed in FIG. 2, is exemplary only. However, a register for storing each of the elements of data for each parameter employed must be provided in block 5. Consequently, for the example here explained, there are ten registers for the operating parameter, namely, lubricating oil. As previously explained, the sensor employed for this parameter is fuel consumption located in the fuel tank. Thus, unless the system is at the beginning of a maintenance cycle, there will be ten values proceeding in roughly decreasing magnitude with time standing in ten registers in block 5 for the operating parameter, namely, fuel consumption representing oil change.

For the purposes of explanation, it will be assumed that the useful figure to be derived from the load diagram is an average fuel consumption and thus, the procedure will be described in terms of determining an average figure. Thus, in step 315, the computer adds the incremental values from the ten registers for the command parameter for all of the periods used in generating the load diagram and, in step 316, divides the sum so achieved by the number of load diagram periods thus obtaining an average figure for the command parameter. This is stored, step 317, in the memory 3.

While we have described the determination of a figure for a parameter employed in the load diagram as an average figure, this is for explanatory purposes only. The figure determined by comparable steps may be the maximum value of the ten periods, the minimum period of the ten periods, the mean or any other figure for which the desired mathematical relationship is available.

Inasmuch as a plurality of parameters may be employed in generation of load diagram data, the computer proceeds to process and store the necessary figures representing each parameter employed in generating the load diagram. It will be appreciated that in generating the load diagram the use of the command parameter and an operating parameter have been described. It is conceivable, of course, that only operating parameters may be involved.

Suffice it to say that, at step 318, the steps of deriving the appropriate value for each parameter, average, mean or the like, are performed, steps which are comparable to steps 315-317 previously described as determining an average value for the command parameter.

Inasmuch as all data is available in the two (or more) groups of registers for present values for the parameters employed in the generation of the load diagram, these values may be plotted as a load diagram on plotter 7, adding to the plot the resultant figures, average or other, determined by steps 315, 316, 317 and 318. This is shown by block 319.

Before leaving the discussion of the generation of load diagrams, it is appropriate to note that the generation of load diagram as in the operation of sensing the command and operating parameters, is an ongoing thing. Once data for each of the prescribed number of time periods for a load diagram has been gathered and stored, upon the completion of the next additional period, the oldest data stored may be replaced by the data of the newest time period so that the load diagram is composed always of the most recent group of time periods prescribed, in the example, the number is ten.

The resultant figures derived for the respective operating parameters in steps 315, 316 and 317, or the like, are to be used in either lengthening or shortening the distance, the completion of which will require maintenance for a particular operating or command parameter. The relationship between the parameters employed in generating the load diagram will be dictated by the circumstances involved in the particular system and may be related in any algrebraic form that is appropriate. For the purposes of explanation, it will be assumed that the effect of the command parameter, fuel consumption representing engine oil condition will be added to the effect of brake lining wear to achieve a factor which will be used to either extend or contract the limit value at which the operating parameter is signalled to require maintenance. Since the two parameters are different in character, it will be appreciated that scale factors must be entered to provide useful results. Thus, a scale factor $F_C$ will be used to multiply the average figure for fuel consumption obtained in steps 315-317 and a scale factor $F_O$ will be used to multiply the average figure for the operating parameter derived in steps comparable to 315-317. The two products will be added, thus achieving the summation of the two effects previously described to determine the load diagram factor (LDF). This mathematical exercise may be represented by the equation $$F_C \cdot C + F_O \cdot O = LDF$$

The two factors $F_C$ and $F_O$ are entered at block 305 and may be selected such that a value of LDF which represents 1.0 will make no change when divided into the limit value of the command or operating parameter whereas a value for LDF greater than 1, when divided into the limit value will reduce the distance before which maintenance occurs. Conversely, a value of LDF less than one, for example, 0.8, will extend the distance established by the limit value at which a maintenance alarm occurs.

The determination of load diagram factor, LDF is shown in the diagram at 320. It is observed however that the equation stated above is for the present example only and other relationships will obtain when other factors are employed in generating the load diagram.

It will be remembered that the operator entered, by way of console 6, step 304, a value for estimated driving condition. Such a factor may be employed to extend or contract the limit value for the operating parameter in the same manner effected by the load diagram factor, LDF. Thus, if a designating driving condition is normal, it will produce a factor to be applied equivalent to 1.0 whereas a heavy driving condition e.g., urban driving or 180 km/h will be a value exceeding 1.0 and light conditions will represent values less than 1. Both the LDF and the estimated driving condition represent effects to be used in expanding or contracting the point in time or distance at which maintenance is to be signalled. While any relationship may be employed, safety suggests that whichever is larger will be used to apply to the command and operating parameters. Thus, block 321 represents a comparison of the load diagram factor, LDF, with the magnitude of the estimated driving condition parameter. Whichever is larger is used, for the purposes of the explanation, as a magnitude to apply to the command and operating parameters.

It will be appeciated by those skilled in the art that an alternate operation in block 321 may be the sole use of the estimated driving condition entered by way of keyboard without reference to the load diagram factor and, alternatively, the load diagram factor may be used without comparison with the estimated driving condition factor input by way of keyboard.

Thus, if the load diagram factor is to be used, block 321 may be bypassed. Alternatively, if the estimated driving condition factor input by keyboard is used without reference to the load diagram factor, block 321 would serve to withdraw the estimated driving condition factor from memory for application to the parameters. In such a condition, the load diagram factor data may be retained in the computer for future use and, alternatively, may be displayed on the load diagram plotter 7 for general information.

Block 322 represents the generation of extrapolated command parameter driving condition data. For the purposes of explanation, it will be assumed that in block 321, the larger of the two magnitudes of the load diagram factor, LDF, and the estimated driving condition factor input by keyboard, was determined to be, for example, 1.2. Inasmuch as, in block 302, a limit value for the command parameter, namely, 10,000 km was input, together with factors representing fuel consumption for the four driving conitions, it now becomes possible to modify the initial data by applying the factor 1.2. This factor, being greater than 1, as previously described, represents intensive vehicle use which will be employed to shorten the limit value:

Limit value of urban
operation = $1/1.2 \times 10,000 = 8,333$ km

Limit value for 90
km/h = $22/11.3 \times 1/1.2 \times 10,000 = 16,250$ km

Limit value for 120
km/h = $22/13.5 \times 1/1.2 \times 10,000 = 13,666$ km

Limit value for 180
km/h = $22/22 \times 1/1.2 \times 10,000 = 8,333$ km.

These four limit values are transmitted by the central processing unit 2 to be displayed respectively in indicators 81, 82, 83 and 84, block 323.

Inasmuch as it is necessary to determine whether the alarm for maintenance service should be activated, it is necessary to compare the present sensed value ($P_C$) of the command parameter with the stored limit value ($L_C$). This is shown in block 324 and, as indicated in block 325 if the present value is not equal to or greater than the stored limit value, the program can proceed directly to evaluate operating parameters. However, if the present value is equal to or greater than the limit value, the maintenance service light at 85, FIG. 1, is activated as shown in block 326.

A response of NO at 327 and also following performance of block 326 at 328, the central processing unit will generate extrapolated operating parameter driving condition data as shown at 329 and display the same at 330 in indicators $81_1$–$84_1$, FIG. 1. It will be appreciated that the same mathematical steps are employed in block 329 as in block 322, the only difference being the use of operating parameter data for one of the operating parameters.

Similarly, a comparison step at 331 of the present sensed value $P_O$ of the operating parameter is effected with the stored limit value $L_O$ and if the former is equal to or greater than the latter, the computer tests at 332.1 whether the value in kilometers standing in the sensed value register in memory 5 for the particular operating parameter involved falls within the kilometer tolerance band stored for the command prameter. If the answer is YES, the maintenance service operating parameter light 85, FIG. 1, is activated, block 333. A response of NO at 334, and also after the actuation of the service light in block 333, see output 335, the procedure leads to a subsequent test for the next operating parameter to be processed. If all operating parameters have not been processed, the loop returns by way of 337 to select the next operating parameter to be processed.

It will be appreciated that as the loop serially recycles via 337, the subsequently processed operating parameters will present indications in comparable indicating areas such as 87, 88 and 89 of FIG. 1. The vehicle operator thus has data on the command parameter and all operating parameters falling within the command parameter tolerance band displayed. The order in which particular parameters are selected by processing through the loop 329–336 is not critical inasmuch as all parameters are ultimately serviced by the loop. Inasmuch as the program processes through its entire series of steps in a matter of milli-seconds, time delays in processing are relatively unimportant.

When all operating parameters have been processed, the procedure exits blocks 336 on line 338.

At this point, it will be recognized the the procedure of the invention has been described as one in which, as the vehicle is operated, successive indicators will have their respective alarms 85, 86 and the like set as indications of maintenance required, and that, moreover, indications such as 81–84 are presented continually while the system is in operation. In this mode of operation, the program formally terminates at block 339 and recommences at start 300, the process continuing cyclically as long as the system is operating.

The invention also contemplates, however, that it may be desirable for the indicators to remain in the ON condition only for a fixed period of time. Thus, it may be expedient for the vehicle operator, when starting operation, to be able to review all of the indicators for a fixed brief period of time, after which the indicators are turned off so as to avoid visual annoyance in the operator's area.

For this purpose, the invention contemplates a program switch on console 6 which admits an additional step in which the ignition key is polled, along with the polling operation previously described with regard to the sensors 1 and the console 6. At block 340 the central processing unit 2 determines whether the ignition key 9 is on. This may be effected by causing the ignition key 9 to operate a switch 10 to connect battery voltage 12 to be presented to the central processing unit for sensing. If the CPU 2 determines that the ignition switch is on, it may set a timer consisting of a series of timing chains within the central processing unit as shown in block 341. The time period may be some arbitrary length during which the vehicle operator may view the indicators 8, for example, 10 seconds. It will be appreciated that a longer or shorter period of time may be expedient in certain circumstances.

During this period, all indicators which had been activated by the program will remain on. When the timer chain completes its cycle, the exemplary 10 seconds, the CPU may deactivate all of the indicators, as shown at block 342. If the ignition key is off, no timer is set and the procedure exits by way of line 343 to terminate at 344. Again, termination at 344 represents only the end of the process followed immediately by continued cycling starting at 300 as long as the system is operating.

From the foregoing, it will be understood that inasmuch as the vehicle operator has control to terminate the procedure at step 339, at which point indicators may be on, the operator has an override in the sense that if the console switch which actuates manual control termination at 339 is actuated at any time, indications may be displayed. In its alternative position, the switch of step 339 places the program under the control of the ignition key for the purposes of producing indications only for a limited period. Thus, for example, during maintenance, the ignition key may be activated to show the state of the parameters on the indicator 8.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A method for determining maintenance and service intervals for a vehicle comprising
    storing a limit value for a vehicle command parameter,
    sensing an actual value of the command parameter,
    performing a first comparison of the sensed actual value with the limit value for the vehicle command parameter,
    displaying a maintenance alarm when said first comparison step produces a substantial match of the two values,
    storing a limit value for at least one vehicle operating parameter, storing a maintenance indication threshold value as a fraction of said limit value for said at least one operating parameter, sensing an actual value of the at least one operating parameter, performing a second comparison of the sensed actual value with the maintenance indication theshold value for the at least one operating parameter if the first comparison step produced a substantial match, displaying at least an additional maintenance alarm for said operating parameter when said second comparison step determines that the actual value of said sensed operating parameter exceeds the maintenance indication threshold value.

2. A method for determining maintenance and service intervals in accordance with claim 1 comprising determining load diagram data representing at least one of an operating parameter and command parameter as a first variable and time as a second variable.

3. A method for determining maintenance and service intervals in accordance with claim 1, further comprising the steps of extrapolating at least one value of at least one of said command parameter and said operating parameter from the corresponding said established limit value, indicating said extrapolated limited value.

4. A method for determining maintenance and service intervals in accordance with claim 1, comprising storing at least two different limit values for a command parameter to form a tolerance band therebetween, and performing said displaying step for the additional maintenance alarm only when the sensed value of the operating parameter falls within said tolerance band.

5. A method for determining maintenance and service intervals in accordance with claim 1, wherein said command and operating parameters are drawn from at least one of mileage count, fuel consumption time and a combination of these variables, further comprising the steps of storing at least a lower and an upper limit value for a parameter, and displaying a maintenance alarm when the sensed value of a parameter assumes a magnitude which is one of less than the lower limit value and greater than the upper limit value.

6. A method for determining maintenance and service intervals in accordance with claim 4, wherein the command parameter is one of brake lining condition and engine oil condition.

7. A method for determining maintenance and service intervals in accordance with claim 6, wherein engine oil condition is determined by the step of sensing fuel consumption.

8. A method for determining maintenance and service intervals in accordance with claim 1, further comprising the steps of storing a limit value for fuel consumption, sensing actual fuel consumption, totalizing actual fuel consumption, comparing the totalized fuel consumption with the said limit value therefor, and displaying a maintenance alarm in accordance with the result of said last comparison step.

9. A method for determining maintenance and service intervals in accordance with claim 1, wherein said steps of sensing actual values are performed by sensing the wear of at least one of said operating parameters.

10. A method for determining maintenance and service intervals in accordance with claim 1, wherein said steps of sensing actual values are performed by intermittently sensing wear of at least one of said operating parameters at a first stage of wear and subsequently at said limit value therefor.

11. A method for determining maintenance and service intervals in accordance with claim 3, wherein at least one of said steps of displaying comprises continuously displaying a maintenance alarm during driving and the method further comprises continuously displaying said extrapolated limit values.

12. A method for determining maintenance and service intervals in accordance with claim 3, wherein at least one of said steps of displaying comprises displaying a maintenance alarm at specific intervals of time and the method further comprising displaying said extrapolated limit values at specific intervals of time.

13. A method for determining maintenance and service intervals in accordance with claim 1, wherein at least one of said steps of displaying comprises displaying said maintenance alarm in response to the condition of vehicle ignition.

14. A method for determining maintenance and service intervals in accordance with claim 11, wherein at least one of said steps of displaying comprises displaying a maintenance alarm in response to the condition of vehicle ignition.

15. A method for determining maintenance and service intervals in accordance with claim 1, further comprising the step of registering a signal indicating that maintenance work has been carried out.

16. A method for determining maintenance and service intervals in accordance with claim 1, wherein said displaying steps comprise displaying the condition of the operating parameters during the conduct of maintenance operations on the vehicle.

17. Apparatus for determining maintenance and service intervals for a vehicle comprising means for storing a limit value for a vehicle command parameter, means for storing a limit value for at least one vehicle operating parameter, means for storing a maintenance indication threshold value as a fraction of said limit value for said at least one operating parameter, means for sensing an actual value of the at least one operating parameter, processing means for performing the functions of sensing an actual value of the command parameter, performing a first comparison of the sensed actual value with the limit value for the vehicle command parameter, displaying a maintenance alarm when said first comparison produces a substantial match of the two values, performing a second comparison of the sensed actual value with the maintenance indication threshold value for the at least one operating parameter if the first comparison produced a substantial match, and means for displaying at least an additional maintenance alarm for said operating parameter when said second comparison determines that the actual value of said sensed operating parameter exceeds the maintenance indication threshold value.

18. Apparatus for determining maintenance and service intervals in accordance with claim 17 wherein said processing means performs the function of
generating data representing a load diagram data representing at least one of an operating parameter and command parameter as a first variable and time as a second variable.

19. Apparatus for determining maintenance and service intervals in accordance with claim 17,
wherein said processing means performs the functions of extrapolating at least one value of at least one of said command parameter and said operating parameter from the corresponding said established limit value, and indicating said extrapolated limit value.

20. Apparatus for determining maintenance and service intervals in accordance with claim 17, comprising
means for storing at least two different limit values for a command parameter to form a tolerance band therebetween, and
means for performing said display for the additional maintenance alarm only when the sensed value of the operating parameter falls within said tolerance band.

21. Apparatus for determining maintenance and service intervals in accordance with claim 17, wherein said command and operating parameters are drawn from at least one of mileage count, fuel consumption time and a combination of these variables, further comprising
means for storing at least two different limit values for a parameter, and
means for displaying a maintenance alarm when the sensed value of a parameter crosses one of said lower and upper limits.

22. Apparatus for determining maintenance and service intervals in accordance with claim 20, wherein
the command parameter is one of brake lining condition and engine oil condition.

23. Apparatus for determining maintenance and service intervals in accordance with claim 22, wherein engine oil condition is determined by
means for sensing fuel consumption.

24. Apparatus for determinng maintenance and service intervals in accordance with claim 17, comprising
means for storing a limit value for fuel consumption,
means for sensing actual fuel consumption, and
wherein said processing means performs the functions of totalizing actual fuel consumption, comparing the totalized fuel consumption with the said limit value therefor, and the apparatus further comprises
means for displaying a maintenance alarm in accordance with the result of said last comparison.

25. Apparatus for determining maintenance and service intervals in accordance with claim 17, wherein said sensed actual values are determined by
means for sensing the wear of at least one of said parameters.

26. Apparatus for determining maintenance and service intervals in accordance with claim 17, wherein said sensed actual values are determined by
means for intermittently sensing wear of at least one of said parameters at a first stage of wear and subsequently at said limit value therefor.

27. Apparatus for determining maintenance and service intervals in accordance with claim 19, wherein at least one of said means for displaying comprises
means for continuously displaying a maintenance alarm during driving and the apparatus further comprises
means for continuously displaying said extrapolated limit values.

28. Apparatus for determining maintenance and service intervals in accordance with claim 19, wherein at least one of said means for displaying comprises
means for displaying a maintenance alarm at specific intervals of time and the apparatus further comprises
means for displaying said extrapolated limit values at specific intervals of time.

29. Apparatus for determining maintenance and service intervals in accordance with claim 17, wherein at least one of said means for displaying comprises
means for displaying said maintenance alarm in response to the condition of vehicle ignition.

30. Apparatus for determining maintenance and service intervals in accordance with claim 27, wherein at least one of said means for displaying comprises
means for displaying a maintenance alarm in response to the condition of vehicle ignition.

31. Apparatus for determining maintenance and service intervals in accordance with claim 17 wherein said processing means registers a signal indicating that maintenance work has been carried out.

32. Apparatus for determining maintenance and service intervals in accordance with claim 17, wherein said displaying means comprises
means for displaying the condition of the operating parameters during the conduct of maintenance operations on the vehicle.

33. A method of determining maintenance and service intervals in motor vehicles, wherein the driver is given a recommendation by means of a display to perform maintenance or servicing when a value of a guiding parameter, determined to be important for maintenance or servicing, corresponds to a predetermined value of the guiding parameter stored in a memory of a computer, whereby the determined value of this guiding parameter can be changed by other operating parameters, comprising the steps of
receiving in a computer memory additional characteristic values for the condition of vehicle parts requiring maintenance as a function of wear,
comparing said values with values likewise stored in the memory and corresponding to the wear limits of the vehicle parts in question,
generating data representing a load diagram in the computer from additional operating parameters,
determining from at least the additional operating parameters whether the vehicle is being operated primarily in the partial load or full load mode,
extrapolating a wear-limiting value for each of the vehicle parts from at least a corresponding stored value by means of the data representing the load diagram, and
matching the wear-limiting values of the vehicle parts with data representing maintenance or servicing determined by the guiding parameter, when the values and data lie within a fixed range of tolerance of the data.

* * * * *